Dec. 16, 1958  A. D. ARNEMAN ET AL  2,864,413
GANG SAW

Filed Feb. 21, 1956  6 Sheets-Sheet 1

INVENTORS
ARTHUR D. ARNEMAN
PAUL O. EDWARDS
BY
ATTORNEYS

Dec. 16, 1958 A. D. ARNEMAN ET AL 2,864,413
GANG SAW
Filed Feb. 21, 1956 6 Sheets-Sheet 3
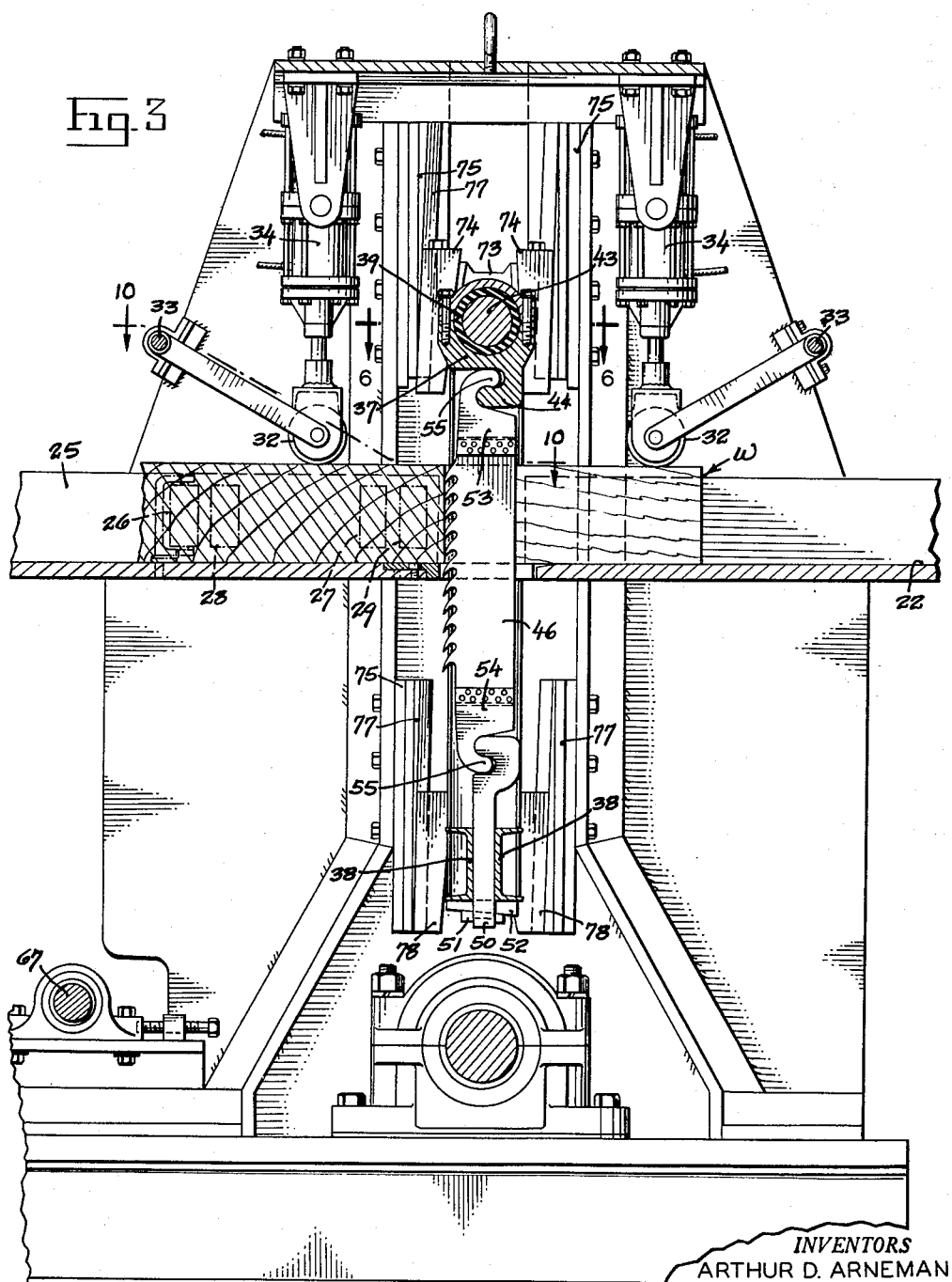
INVENTORS
ARTHUR D. ARNEMAN
PAUL O. EDWARDS
BY
ATTORNEYS

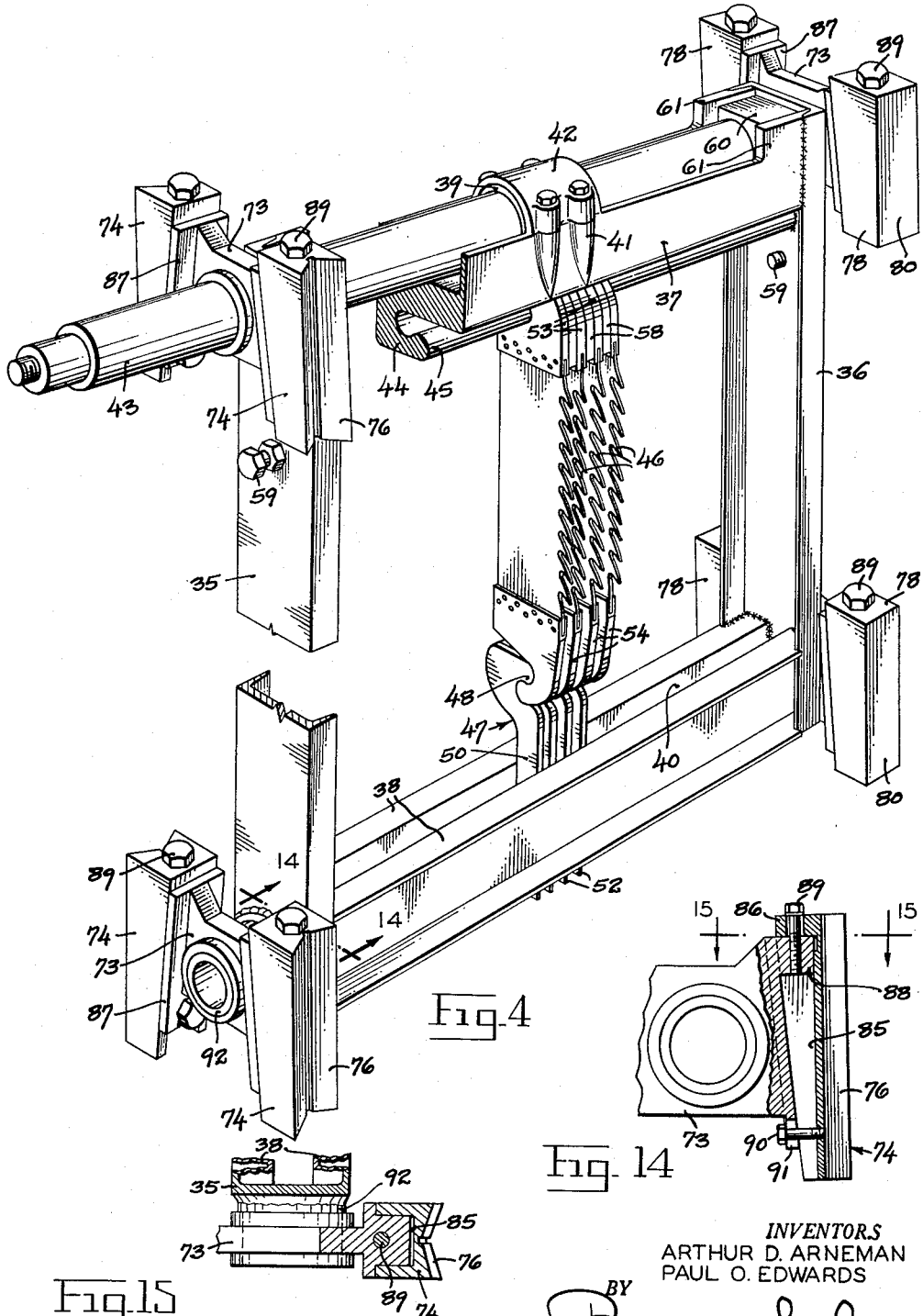

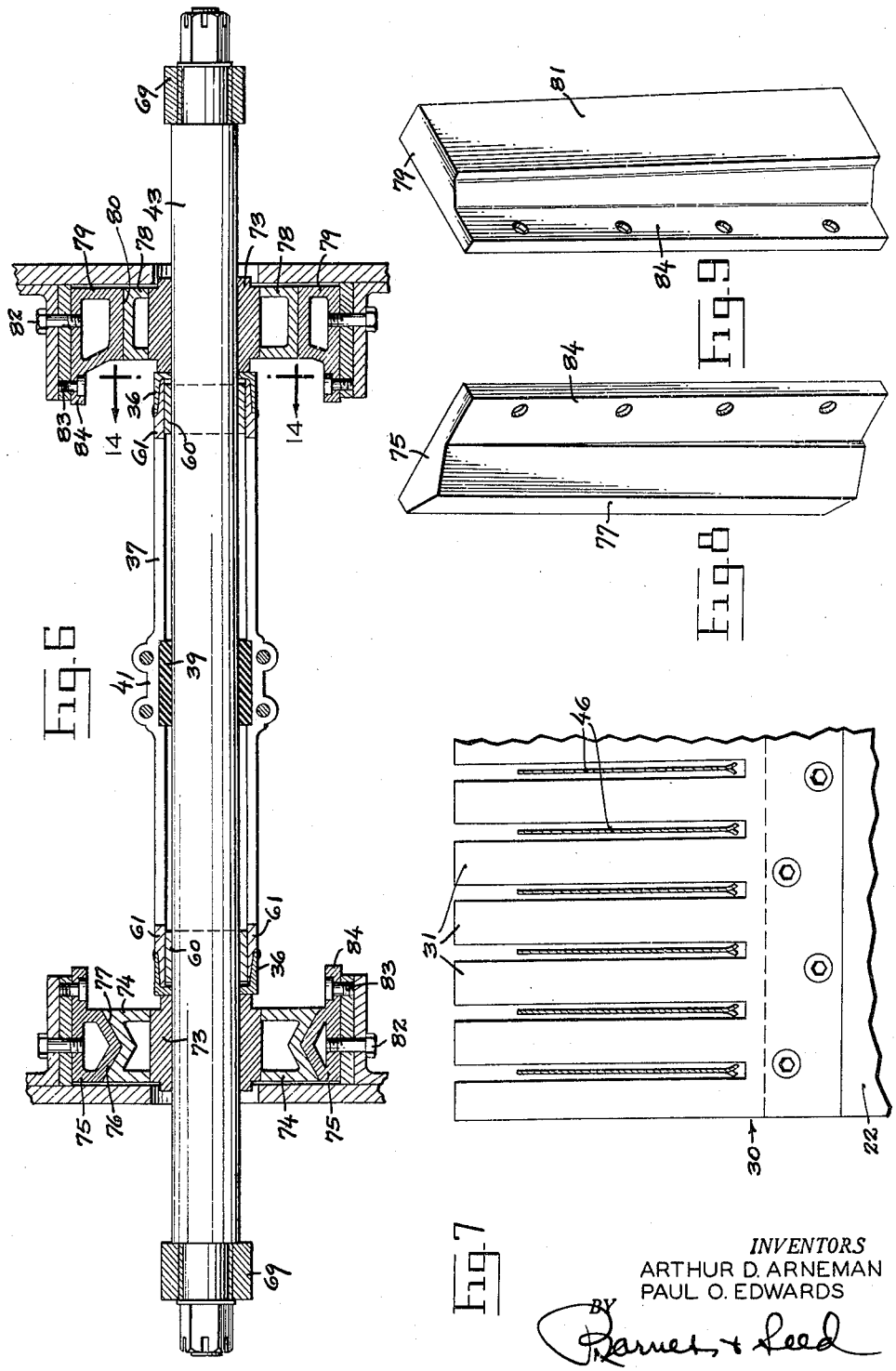

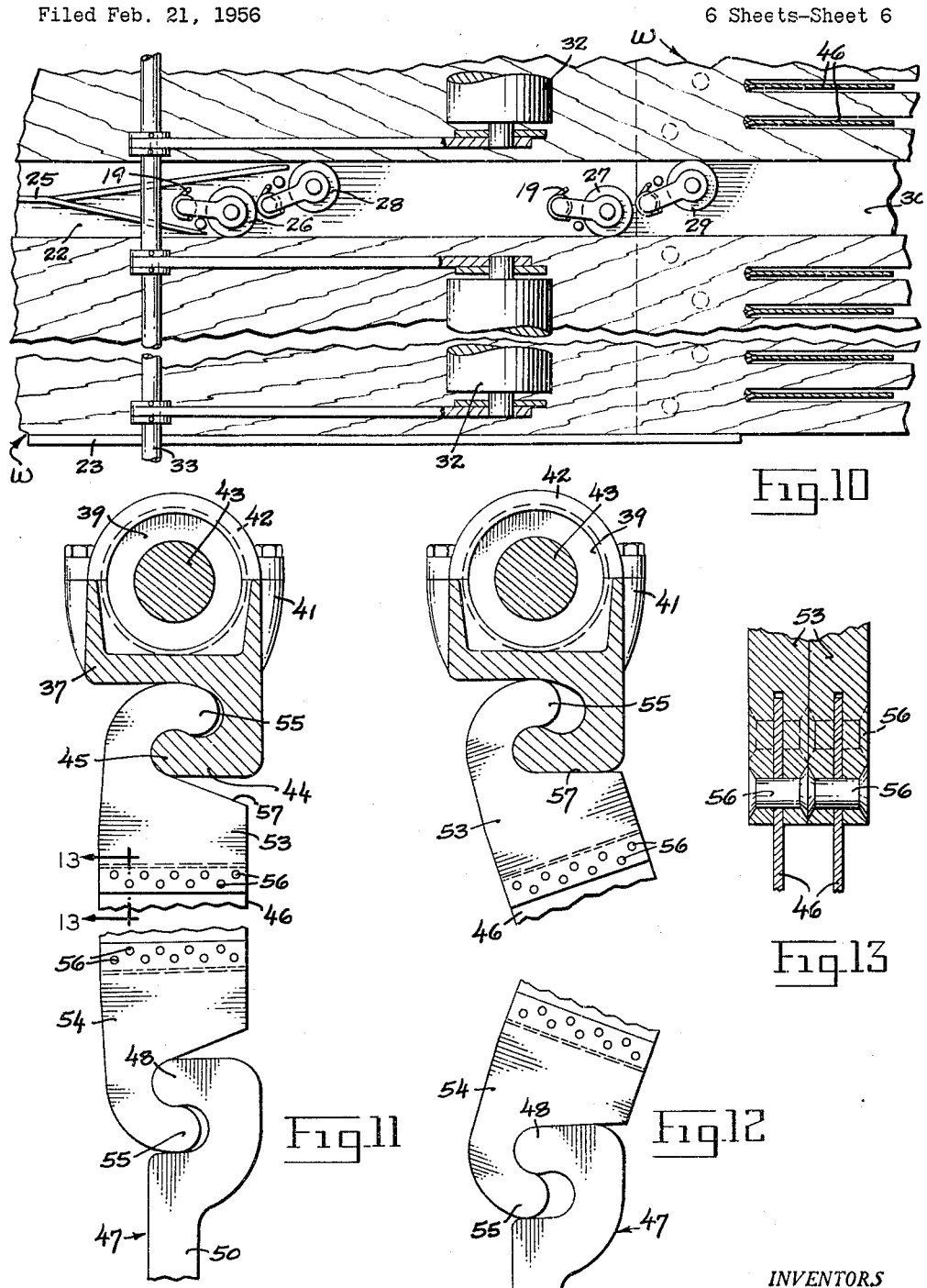

United States Patent Office 2,864,413
Patented Dec. 16, 1958

2,864,413

GANG SAW

Arthur D. Arneman and Paul O. Edwards, Seattle, Wash., assignors to Johnson Manufacturing Co., Seattle, Wash., a corporation of Washington Application February 21, 1956, Serial No. 566,885

2 Claims. (Cl. 143—60)

This invention relates to gang saws, and namely, that type of saw in which multiple saw blades are set at fixed distances, one from another, in a frame or sash mounted for vertical reciprocating motion.

As one of its principal objects the invention aims to provide a perfected means of hanging the saw blades in the sash, a means, more particularly, which enables the blades to be placed in closer proximity than has been heretofore possible, and effects an especially secure connection between blades and sash while at the same time permitting the blades to be applied to or removed from the sash with unusual ease and expedition.

It is a further and important object to devise an improved slide mounting for the reciprocatory vertical movement of the sash, and one adjustable for wear.

As a further object still the invention aims to provide a gang saw passing motion to the sash by means of a cross-shaft activated from pitman arms engaging each of the two ends of the cross-shaft, and wherein the vertical motion of the cross-shaft is transferred to the sash in such a manner as to obviate liability of any binding taking place in the event that the crank pins may be slightly out of phase.

It is a yet further object to engineer an improved feed for the work to be sawed, one especially aimed at the elimination of cant chatter and minimum fraying of the work along the edges of the saw kerfs.

The invention further aims to provide a husky and substantial machine which will withstand long and hard usage, which can handle the strains of overloading, and effectively meet shock stresses.

With the above and other still more particular objects and advantages in view, and which will each appear and be understood in the course of the following description and claims, the invention consists in the novel construction and in the adaptation and combination of parts hereinafter described and claimed.

In the acompanying drawings:

Fig. 3 is a fragmentary longitudinal vertical sectional view drawn on line 3—3 of Fig. 2, and incorporating a showing of a cant, or line of cants, in process of being fed through the gang of saws.

Fig. 4 is a fragmentary perspective view of the machine, directed principally to an illustration of the saw sash and the slippers which carry the sash in the latter's reciprocatory vertical motion.

Fig. 5 is a fragmentary transverse vertical sectional view drawn to an enlarged scale on the substantial vertical center line of the cross-shaft which passes reciprocatory vertical motion to the sash.

Fig. 6 is a horizontal sectional view drawn to an enlarged scale on line 6—6 of Fig. 3.

Fig. 7 is a fragmentary top plan view drawn to an enlarged scale on line 7—7 of Fig. 2.

Figs. 8 and 9 are enlarged-scale perspective views of the guides on which the sash-carried slippers slide, the former portraying the guides for the slippers provided at one side and the latter portraying the guides for the slippers provided at the other side of the sash.

Fig. 10 is a fragmentary horizontal sectional view drawn to an enlarged scale on line 10—10 of Fig. 3.

Fig. 11 is a fragmentary longitudinal vertical sectional view drawn to an enlarged scale to illustrate the interlocking arrangement by which the saw blades are secured to the sash.

Fig. 12 is a view similar to Fig. 11 portraying the manner in which the saw blades are applied to and removed from the sash.

Fig. 13 is a detail fragmentary vertical sectional view drawn to an enlarged scale on line 13—13 of Fig. 11.

Fig. 14 is a detail fragmentary vertical sectional view drawn to an enlarged scale on line 14—14 of Fig. 4; and Fig. 15 is a fragmentary horizontal sectional view on line 15—15 of Fig. 14.

Figure 1:
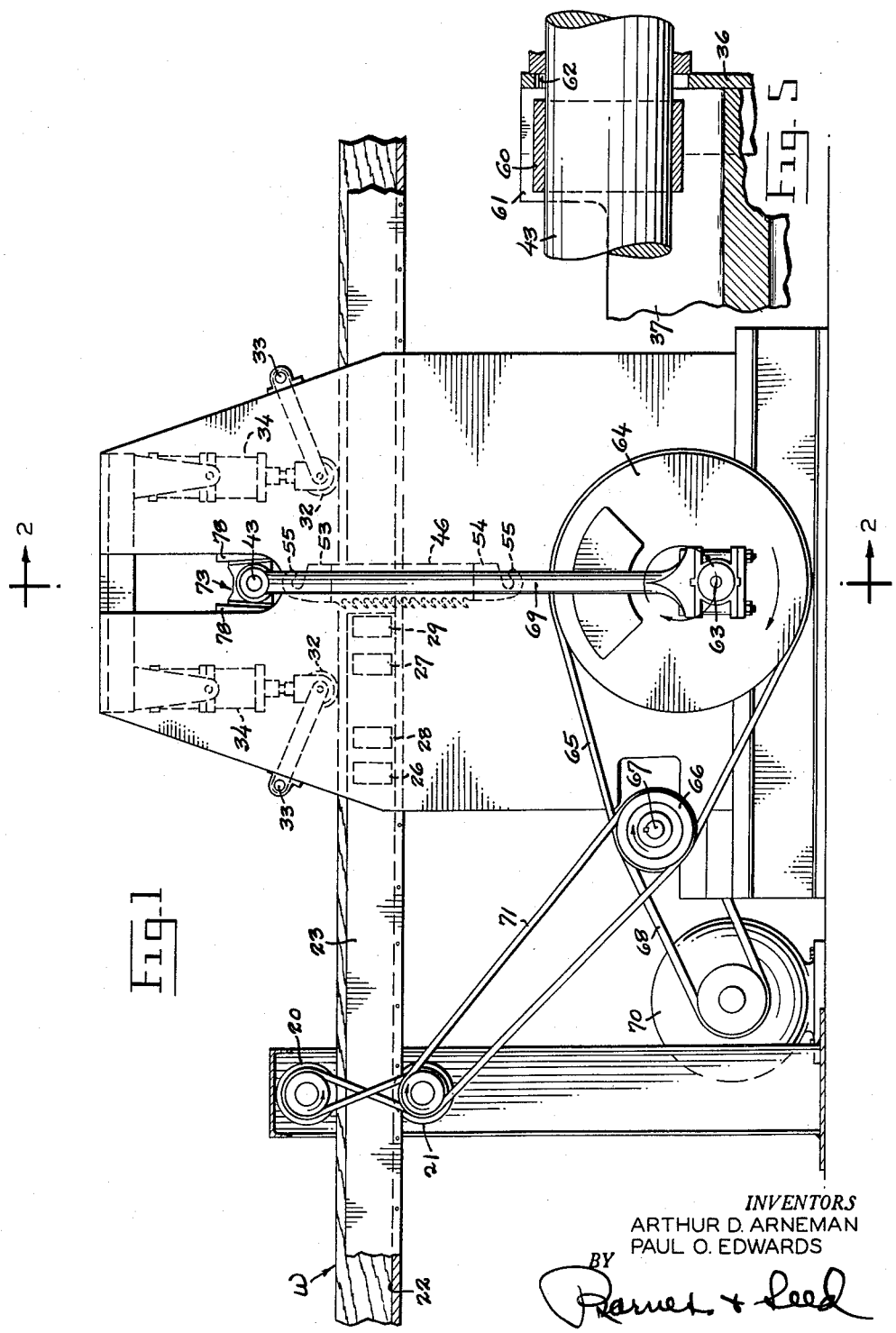
Figure 1 is a fragmentary side elevational view of a gang saw constructed to embody the preferred teachings of the present invention.

Referring to said drawings, the numerals 20 and 21 denote upper and lower drive rollers acting to impart continuous forward motion to one or more lines of wood cants W as the latter move along a horizontal travel path to and beyond a position whereat the same are subjected to the cutting action of a gang of saws. The saws are hung in a frame or sash including cross-heads mounted for reciprocatory vertical motion in guides secured to a machine frame. Such saws and the hanger arrangement therefor will be hereinafter described in detail.

In the form in which we have here elected to illustrate the invention there are two parallel walk-ways for the wood cants, thus to double the capacity of the machine, and producing these walk-ways is a floor 22 fenced along each edge by a side rail, as 23 and 24, and divided along the longitudinal center line by a parting rail 25. Each walk-way has a width moderately wider than the width of the wood cants, and as a self-adjusting complement to its outer rail each walk-way, immediately adjacent the saws, is provided along the inner edge with a pair of rollers, as 26—27 and 28—29, urged toward the outer rail by springs 19. The floor itself terminates short of the saws both at the front and rear of the latter, and occupying the gap which is thus provided and producing a fingered prolongation of the lead-in section of the floor is a replaceable comb-like appendage 30. The fingers 31 of this comb are spaced in correspondence with the spacing between the saws of the gang and sustain the cants as the latter traverse the saws. Hold-down rolls 32 hinged at 33 and subjected to the yielding pressure of compressed air delivered to overhead cylinders 34 bear upon the cants to the front and rear of the saws.

The sash of the present invention is comprised of side stiles 35 and 36 having a head rail 37 welded thereto at the top and a pair of girders 38 welded thereto at the bottom, each such stile and girder being, by preference, sectionally of a channel configuration. In the instance of the stiles, the channels are placed with the gutters facing one another. The girders 38 are placed back-to-back in spaced relation so as to provide a transversely extending vertical slot 40 therebetween. The head rail 37, while also generally of a channel shape in section having its gutter positioned uppermost, is produced as a special casting so as to provide within the gutter and centrally of its length an upwardly facing bearing block 41 having as its complement a removable cap 42. Movement of the sash is obtained from a cross-shaft 43 mounted so as to partake of bodily reciprocatory motion in a vertical direction, and this shaft is gripped, with an intervening compressed bushing 39 of rubber, between said block 41 and its cap complement 42. The shaft, its mounting, and the source from which it derives its movement will be hereinafter more particularly described.

Further in reference to the sash it will be seen that the head rail 37 thereof is provided along its underside with a ledge 44 extending substantially the full width. Such ledge functions as a top hanger for the gang of saws and is sectionally of a hook shape with the bill pointing towards the front of the machine, or which is to say in a direction opposite to the travel of the wood cants. The underside of this hooking ledge is generally horizontal and has its bill end 45 developed on a substantial radius, carried through somewhat more than a half circle. The gang of saws 46 connect at their top ends with said hanger-ledge 44, and at their bottom ends are attached to respective tensioning spikes 47 which are in turn connected to the sash girders 38. Presenting a terminal hook 48 of substantially the same shape in end elevation as the hanger-ledge 44, said spikes have a thickness somewhat thicker than the saw blades and provide a straight shank 50 arranged to be inserted through the interstice between said girders. For tensioning the stakes, a vertical slot in the bottom end of each shank accommodates a tapered gib 51 and its complement in a tapered cotter 52.

Connection from the saw blades to the hanger-ledge above and to the tensioning spikes below is obtained by hooked adapter tabs, as 53 and 54, respectively, these tabs having a thickness approximately the same as that of the spikes with the hooks, designated by 55, being provided on one end and having, at the other end, a slot into which the related end of the saw blade fits. Flush rivets 56 fixedly secure the adapter tabs to the saw blades. Leaving only bare clearance, the hooking bills of these adapter tabs find substantially a mating fit (see Fig. 11) in the sockets of the hanger 44 and the spikes 47, when the saw blades are in a vertical position, thus establish an interlock which precludes disengagement of the one from the other by bodily forward motion of the blades. Each said tab is relieved by a bias-cut shoulder 57 extending tangent to the half-circle which defines the throat in which the terminal bill 45 or 48, as the case may be, is lodged. This throat is substantially 180° in compass, and this is to say that a line perpendicular to the bias shoulder 57 at its point of tangency traverses the center about which the hooking bill 55 of the adapter tab is developed. A rotation of the tab about the bill 45 into the canted position in which it is illustrated in Fig. 12, after first relieving tension upon the concerned spike and shifting the lower tab laterally so as to free its bill from the spike, permits the bill 45 to be dislodged from the hanger.

Figure 2:
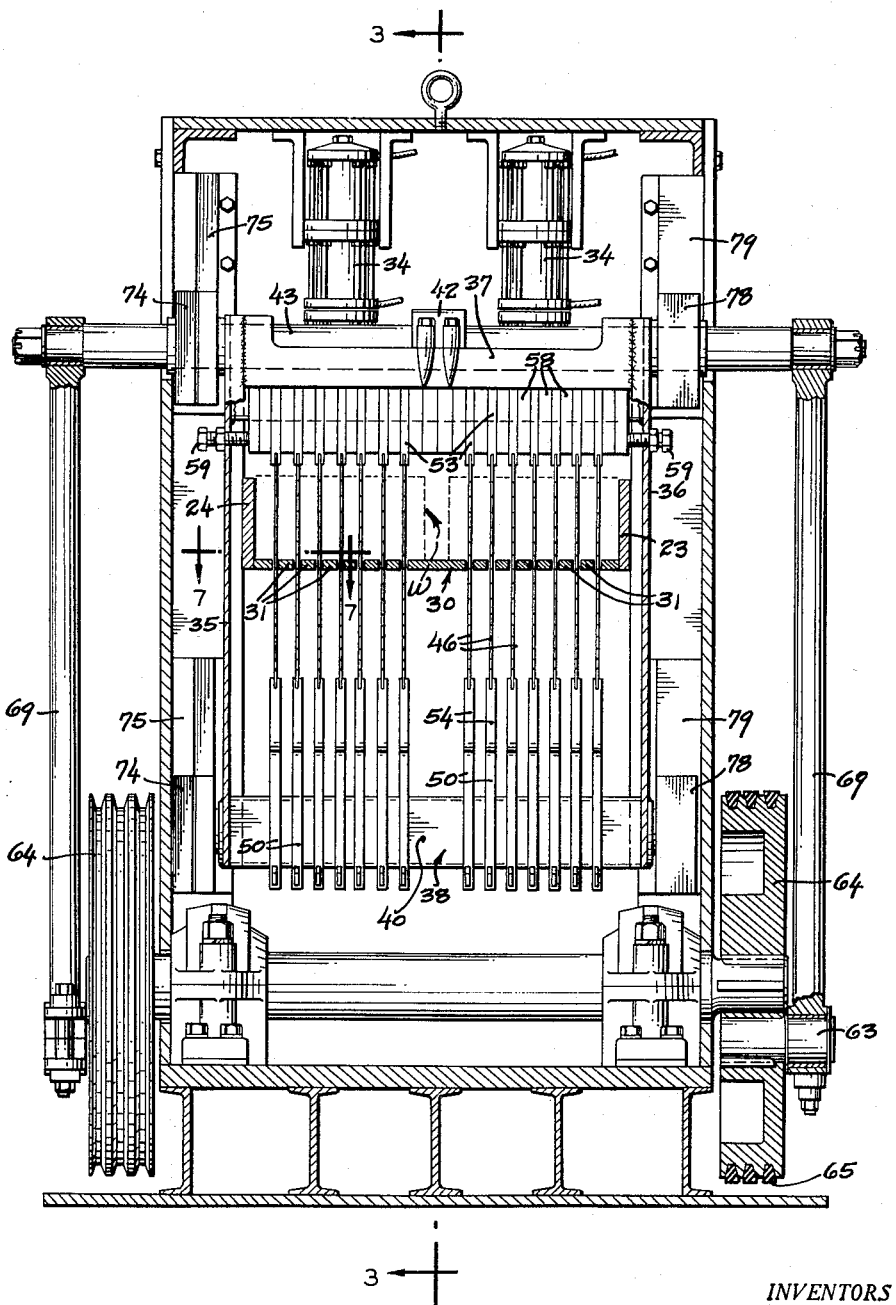
Fig. 2 is a transverse vertical sectional view drawn on line 2—2 of Fig. 1.

In mounting the saw blades in the sash, spacer tabs 58 may be applied between the top tabs 53, as illustrated in Figs. 2 and 4, or, where an unusually close spacing of the saw blades is desired, the tabs 53 may bear directly against one another, as portrayed in Fig. 13. Range bolts 59 carried by the side stiles of the sash produce a lock-up for the head tabs 53.

Now further considering the cross-shaft 43 and its mounting, there is fixed upon the shaft, adjacent each end, a respective bush 60, and this bush finds a sliding fit between upstanding horns 61 presented by the head rail of the sash. The ends of the cross-shaft extend beyond the sash through slots 62 (Fig. 5) in the webs of the side stiles 35 and 36, and connected to each extremity is a pitman arm 69 driven by crank pins 63 from respective flywheels 64. Drive belts 65 extend to the flywheels from pulleys 66 carried by a jack-shaft 67, and powering the jack-shaft is a belt 68 running from an electric motor 70. A belt 71 also passes power from the jack-shaft to the feed rollers 20 and 21.

It should perhaps be here pointed out, if for no other reason than occurrence of wear on the bearings, that it is difficult if not impossible to pass power from cranks through connecting rods to both ends of a reciprocally mounted shaft without encountering minute differences in the motion transmitted by one rod and that transmitted by the other rod. Consequently, unless compensating provision is made therefor, binding will occur in any guided cross-head driven from said shaft. The described rubber bushing between the sash and the cross-shaft of the present invention, and the side guides 60, produce this compensation.

Spaced laterally beyond the sash at each side of the machine, the cross-shaft has a respective cross-head 73 fixed thereon, and secured to each side of each cross-head is a respective slipper arranged to find a slide fit against a related guide secured to the machine frame. Of these slippers and guides, those which occur at one side of the machine are designated by 74 and 75, respectively, and have their mating faces 76 and 77 V-shaped in section. The other slippers and guides, denoted by 78 and 79, have flat bearing faces 80 and 81.

The bearing faces of the guides which lie at opposite sides of the cross-heads, namely at the front and rear thereof, are disposed parallel one with the other in sloping planes, the slope being preferably 5° from the vertical in a direction causing the cross-heads to work forwardly, and which is to say counter to the direction in which the cants are fed, as the cross-heads move in their downward stroke of reciprocation. The means for securing the guides to the frame is comprised of bolts 82 and 83, the former being applied from the rear (see Fig. 6) and the latter taking their purchase against wing extensions 84 of the guides. To adjustably secure the slippers to the cross-heads, the slippers present a groove 85 in their rear face closed at the top by a head wall 86 (Fig. 14), and having its floor parallel to the slide face and defined between side walls which taper downwardly. The cross-heads present oppositely sloped side edges 87 which bear upon the tapered side walls of the slippers and have a tongue 88 which enters the groove. A vertical bolt 89 passes through the head wall 86 to engage the tongue and a horizontal bolt 90 engages a slotted foot 91 of the cross-head. The substantial counterpart of the described cross-head, slipper and guide arrangement is provided for each side of the sash at the lower end thereof, the cross-heads in this instance being journaled upon stub-shafts 92 welded to the side stiles of the sash.

It is thought that the invention and the manner of its operation will have been clearly understood from the foregoing detailed description of our now preferred illustrated embodiment. Changes in the details of construction will appear to those versed in the art and may be resorted to without departing from the spirit of the invention. It is therefore our intention that no limitations be implied and that the hereto annexed claims be given the broadest interpretation to which the employed language fairly admits.

What we claim:

1. In a gang saw, a machine frame, a sash having means for removably securing a gang of saws thereto, block and cap complements of a bearing provided at the head end of said sash in the substantial center thereof, a cross-shaft gripped by said bearing with an intervening bushing of elastic rubber and projecting by the ends laterally beyond the sides of the sash, a respective pitman arm engaging each of said projecting ends, a respective cross-head carried by each of said shaft ends between the related pitman arm and the sash, cross-heads carried by the sash at the bottom end thereof, front and rear slippers on each of said cross-heads, respective guides on said frame providing slide faces mating with slide faces provided by the slippers, power-driven cranks driving said pitman arms, and means for feeding the work along a travel path traversed by said saws.

2. In a gang saw, a machine frame, a sash having means for removably securing a gang of saws thereto, block and cap complements of a bearing provided at the head end of said sash in the substantial center thereof, a cross-shaft gripped by said bearing with an intervening bushing of elastic rubber and projecting by the ends laterally beyond the sides of the sash, a respective pitman arm engaging each of said projecting ends, a respective cross-head carried by each of said shaft ends between the related pitman arm and the sash, cross-heads carried by the sash at the bottom end thereof, front and rear slippers on each of said cross-heads, said slippers at one side of the sash having V-grooved slide faces and those at the other side having flat slide faces, respective guides on said frame providing slide faces mating with the slide faces of the several slippers supporting the cross-heads for vertical reciprocatory motion, power-driven cranks driving said pitman arms, and means for feeding the work along a travel path traversed by said saws.

References Cited in the file of this patent

UNITED STATES PATENTS

| | | |
|---|---|---|
| 8,581 | Ketcham | Dec. 9, 1851 |
| 142,643 | Moody | Sept. 9, 1873 |
| 149,600 | Nichols | Apr. 14, 1874 |
| 210,787 | Lamb | Dec. 10, 1878 |
| 379,657 | Parish | Mar. 20, 1888 |
| 410,474 | Wickes | Sept. 3, 1889 |
| 448,163 | Paine | Mar. 10, 1891 |
| 592,936 | Pryibil | Nov. 2, 1897 |
| 1,563,256 | Crane | Nov. 24, 1925 |
| 1,563,388 | Mattison et al. | Dec. 1, 1925 |
| 1,617,584 | Floeter | Feb. 15, 1927 |
| 1,799,108 | Löf | Mar. 31, 1931 |
| 1,838,437 | Moses | Dec. 29, 1931 |
| 2,722,247 | Schroeder et al. | Nov. 1, 1955 |
| 2,793,660 | Porter | May 28, 1957 |

FOREIGN PATENTS

| | | |
|---|---|---|
| 138,331 | Australia | Aug. 15, 1950 |
| 282,799 | Switzerland | Aug. 16, 1952 |
| 366,032 | Germany | Dec. 28, 1922 |
| 446,196 | Germany | June 24, 1927 |